UNITED STATES PATENT OFFICE.

MATHIAS PIER, OF BERLIN, GERMANY.

PROCESS FOR THE MANUFACTURE OF AMMONIA FROM ITS ELEMENTS.

1,157,253. Specification of Letters Patent. Patented Oct. 19, 1915.

No Drawing. Application filed November 24, 1913. Serial No. 802,750.

*To all whom it may concern:*

Be it known that I, MATHIAS PIER, a subject of the German Emperor, residing at Berlin, Germany, have invented a new and useful Process for the Manufacture of Ammonia from its Elements; and I do hereby declare the following to be a full, clear, and exact description of the same.

While, as is well known, osmium and ruthenium are excellent catalytic agents for the formation of ammonia from the elements, the allied platinum metals iridium and rhodium were formerly useless for this purpose. We have now found that iridium and rhodium are also excellently adapted as catalytic agents for the formation of ammonia, especially when they are spread upon alkaline carriers. For instance, the process is carried out by rendering alkaline a solution of iridium chlorid, so that the iridium precipitates. The precipitated and cleaned product is mixed with an oxid or carbonate of the alkali group or alkaline earth group. The contact mass is dried in a nitrogen-hydrogen current and then it shows preëminent catalytic qualities in the contact furnace.

If rhodium chlorid is prepared in the above mentioned manner, it acts in exactly the same manner and becomes a preëminent catalytic agent for the generation of ammonia.

I claim:

1. A process for the manufacture of ammonia from its elements, said process consisting in uniting the elements to be combined by bringing them into contact with catalytic agents of the platinum group carried by a carrier having therein a combination of an alkali.

2. A process for the manufacture of ammonia from its elements, said process consisting in uniting the elements to be combined by bringing them into contact with catalytic agents containing rhodium.

3. A process for the manufacture of ammonia from its elements, said process consisting in uniting the elements to be combined by bringing them into contact with catalytic agents containing rhodium carried by a carrier having therein a substance containing an alkali.

In testimony whereof, I have signed my name to this specification in the presence of two subscribing witnesses.

MATHIAS PIER.

Witnesses:
 WOLDEMAR HAUPT,
 HENRY HASPER.